US008110290B2

(12) United States Patent
Lee et al.

(10) Patent No.: US 8,110,290 B2
(45) Date of Patent: Feb. 7, 2012

(54) SURFACE COATING METHOD

(75) Inventors: Nikolas Ian Lee, Singapore (SG); Sian Chin Tsai, Singapore (SG)

(73) Assignee: Razer (Asia-Pacific) Pte Ltd., Singapore (SG)

( * ) Notice: Subject to any disclaimer, the term of this patent is extended or adjusted under 35 U.S.C. 154(b) by 782 days.

(21) Appl. No.: 12/023,156

(22) Filed: Jan. 31, 2008

(65) Prior Publication Data

US 2009/0197095 A1 Aug. 6, 2009

(51) Int. Cl.

*B32B 27/00* (2006.01)
*B05D 1/02* (2006.01)
*B44C 1/22* (2006.01)

(52) U.S. Cl. .................. 428/411.1; 428/424.7; 428/500; 427/421.1; 427/271; 216/41

(58) Field of Classification Search ............... 428/424.7, 428/500, 411.1; 427/421.1, 271; 216/41
See application file for complete search history.

(56) References Cited

U.S. PATENT DOCUMENTS

| | | | | |
|---|---|---|---|---|
| 4,611,261 | A * | 9/1986 | Suwa | 361/679.08 |
| 2008/0032095 | A1 * | 2/2008 | Kato et al. | 428/139 |

* cited by examiner

*Primary Examiner* — Thao T. Tran
(74) *Attorney, Agent, or Firm* — Conley Rose, PC

(57) ABSTRACT

A method for forming a multilayer structure on a surface is disclosed. The method comprises forming a body having a surface, the body being substantially light permeable. The method further comprises forming a first layer on the surface of the body, the first layer being substantially light absorbing and having a mark formed therein for permeating light there-through, and forming a second layer on the first layer, the second layer being substantially light permeable. More specifically, the first layer has a mark formed thereon and light is permeable through the multilayer structure for illuminating the mark.

30 Claims, 2 Drawing Sheets

SURFACE COATING METHOD

FIELD OF INVENTION

The present invention relates generally to methods for coating a surface of a body. In particular, the invention relates to a method for forming a multilayer structure on a body surface.

BACKGROUND

Labels are typically used for marking products. Some labels are formed as a piece of tag that is attached to an exterior surface of the products. Other labels are printed directly onto a surface of the products.

Conventional labels are visible under daylight. However, many conventional labels are not visible when natural light is unavailable or insufficient. Some of the conventional labels use backlighting to provide illumination so that the labels are visible when there is an absence of natural light.

However, many conventional labels that use backlighting are not prominently illuminated because the backlighting is neither able to provide sufficient light for illumination the labels nor is directed onto the labels. Increasing the luminance of the backlighting to enable the label to be visually discernable would result in the backlighting being too glaring.

Accordingly, there is a need for displaying a label formed on a surface of a product with an appropriate amount of light for illuminating the label when natural light is unavailable.

SUMMARY

A preferred embodiment of the invention disclosed herein provides a method for forming a multilayer structure on a surface. Additionally, the preferred embodiment of the invention are suitable for displaying a mark on a surface of a product prominently in the absence of natural light with an appropriate amount of illumination.

In accordance to a first aspect of the invention, a method for forming a multilayer structure on a surface is disclosed. The method comprises forming a body having a surface. The body is substantially light permeable. The method further comprises forming a first layer on the surface of the body. The first layer is substantially light absorbing and has a mark formed therein for permeating light therethrough. The method yet further comprises forming a second layer on the first layer. The second layer is substantially light permeable. More specifically, the mark is illuminatable by light permeating through the body towards the first layer.

In accordance to a second aspect of the invention, a multilayer structure formable on a surface is disclosed. The multilayer structure comprises a body having a surface. The body is substantially light permeable. The multilayer structure further comprises a first layer formed on the surface of the body. The first layer is substantially light absorbing and has a mark formed therein for permeating light therethrough. The multilayer structure yet further comprises a second layer formed on the first layer. The second layer is substantially light permeable. More specifically, the mark is illuminatable by light permeating through the body towards the first layer.

In accordance to a third aspect of the invention, a peripheral device is disclosed. The peripheral device comprises a body having a surface and an illuminator contained in the body. At least a portion of the surface outwardly opposes the illuminator. The peripheral device further comprises a first layer formed on the surface of the body. The first layer is substantially light absorbing and has a mark formed therein for permeating light therethrough. The peripheral device yet further comprises a second layer formed on the first layer. The second layer is substantially light permeable. More specifically, the mark is illuminatable by light permeating through the body towards the first layer, the light being generatable by the illuminator.

BRIEF DESCRIPTION OF THE DRAWINGS

A preferred embodiment of the invention is described hereinafter with reference to the drawings, in which.

DETAILED DESCRIPTION

Figure 1A:
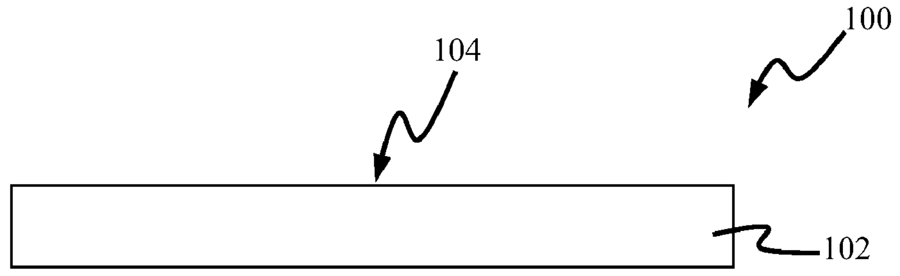
FIGS. 1A to 1D are cross-sectional views that illustrate processing steps for fabricating a multilayer structure according to the preferred embodiment of the invention.

With reference to the drawings, a multilayer structure according to a preferred embodiment of the invention is disclosed for forming a multilayer structure on a surface. Additionally, the preferred embodiment is suitable for displaying a mark on a surface of a product prominently in the absence of natural light with an appropriate amount of illumination.

Various conventional methods for displaying a mark on a surface of a product in the absence of natural light have been previously proposed. Many of these conventional methods are unable to provide sufficient light for illumination the labels.

For purposes of brevity and clarity, the description of the invention is limited hereinafter to forming a multilayer structure on a surface of a body. This however does not preclude the preferred embodiment of the invention from other applications that require similar method of forming the multilayer structure. The functional principles fundamental to the preferred embodiment of the invention remain the same throughout the variations.

In the detailed description provided hereinafter and FIGS. 1A to 2 of the drawings, like elements are identified with like reference numerals.

The preferred embodiment of the invention is described in greater detail hereinafter for a multilayer structure formable on a body surface.

With reference to FIG. 1A, a peripheral device 100, such as a computer mouse having a body 102 with a surface 104 is shown. The body 102 is preferably light permeable so as to allow light from underneath the body 102 to pass therethrough.

The light is preferably generated by an illuminator (not shown), such as a light emitting diode (LED) contained in the body 102 of the peripheral device 100. Specifically, at least a portion of the surface 104 of the body 102 is outwardly opposing or facing away from the illuminator. The body 102 is preferably manufactured from any translucent or transparent material. As an example, a suitable material for manufacturing the body 102 is acrylonitrile butadiene styrene (ABS) plastic.

The body 102 is preferably formed as a unitary structure using an injection molding process. More specifically, the injection molding process involves injecting the ABS plastics into a mold that has a shaped of the body 102.

Figure 1B:
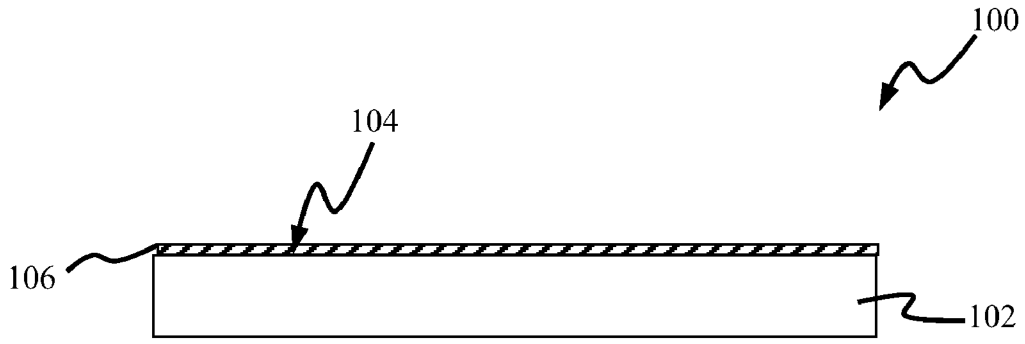

With reference to FIG. 1B, a first layer 106 is preferably formed on the surface 104 of the body 102 through a spray coating process. The spray coating process involves spraying a layer of paint for coating the surface 104 of the body 102.

Preferably, the entire exterior of the body 102 is coated with the first layer. Alternatively, the first layer 106 is formed by other suitable methodologies other than the spray coating process.

The first layer 106 is made of light absorbing material, such as a black or dark coloured paint. The light absorbing material preferably substantially absorbs the light generated by the illuminator and blocks the light from passing through the surface 104 of the body 102.

Figure 1C:
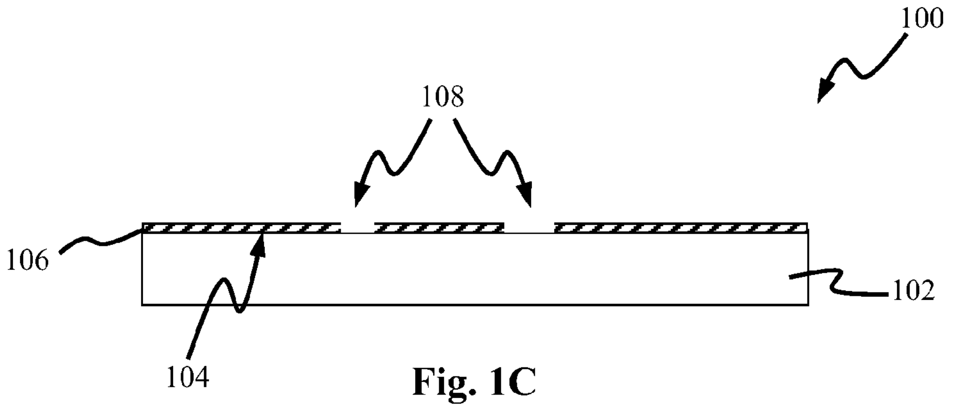

With reference to FIG. 1C, a portion of the first layer 106 is removed to form a mark 108. The mark 108 is preferably formed through the first layer 106 in order to expose a portion of the surface 104 of the body 102. In this manner, the light generated from underneath the surface 104 is able to pass through the surface 104 and the mark 108.

The mark 108 is preferably formed using a laser etching process. The laser etching process preferably involves a laser etching machine for engraving the first layer 106 in order to form the mark 108. Alternatively, the mark 108 is formed by other suitable processes for removing a portion of the first layer 106. The mark 108 depicts a pattern or word that is illuminated by the light radiated from beneath the surface 104 of the body 102.

Figure 1D:
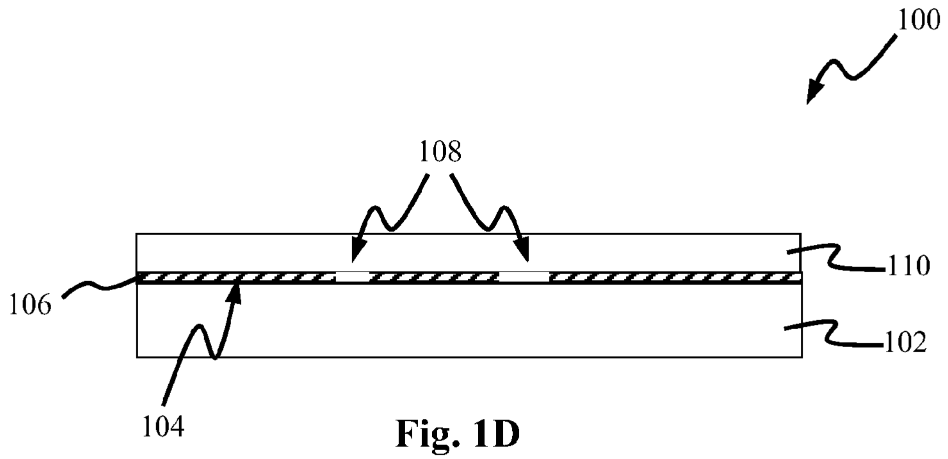

With reference to FIG. 1D, a second layer 110 is formed on the first layer 106. The second layer 110 is preferably formed on the first layer 106 through a coating process. The coating process involves coating a layer of translucent material onto the first layer 106, which is preferably different from the translucent or transparent material used for manufacturing the body 102. An example of a suitable material for forming the second layer 110 is rubberized translucent paint. The second layer 110 is preferably formed to enclose and provide a protective covering over the first layer 106 and the body 102.

The second layer 110 is preferably light permeable and is hydrophobic so as to form a moisture barrier over the first layer 106 and the body 102. For example, a suitable material for forming the second layer 110 is polyurethane (PU). Additionally, the second layer 110 provides better tactile sensation to a user and advantageously improves a user's grip on the body 102 during use of the periphery device 100.

Figure 2:
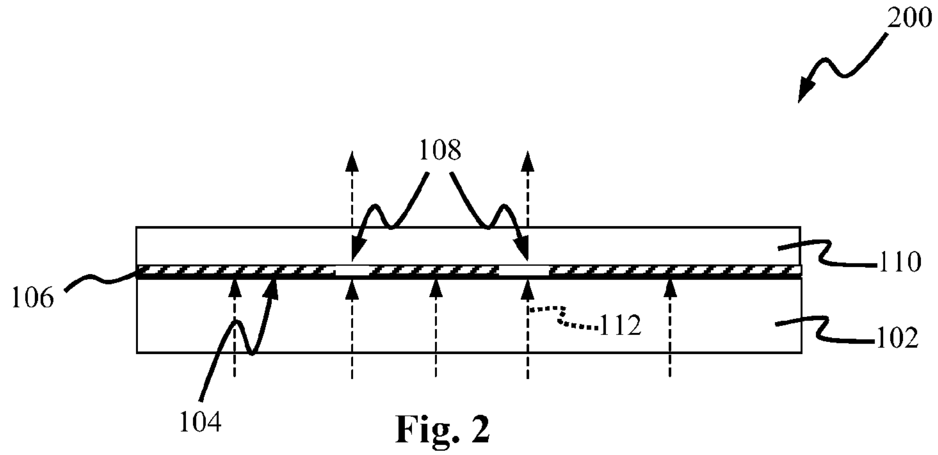
FIG. 2 is a cross-sectional view of the multilayer structure upon completion of the processing steps of FIGS. 1A to 1D.

FIG. 2 is a cross-sectional view of the multilayer structure upon completion of the processing steps of FIGS. 1A to 1D. The body, first and second layers 104, 106, 110 collectively form a three-layer structure 200 for illuminating the mark 108 with light 112 generated from beneath the surface 104.

Although only a preferred embodiment of the invention is disclosed, it becomes apparent to one skilled in the art in view of this disclosure that numerous changes or modification can be made without departing from the scope and spirit of the invention. For example, although laser etch is used in the etching process in the forgoing embodiment, the etching process may be efficiently used if the laser etch is substituted by chemical etch or the like.

What is claimed is:

1. A multilayer structure formable on a surface, the multilayer structure comprising:

a body having a surface, the body comprising an illuminator contained within the body, at least a portion of the surface outwardly opposing the illuminator;

a first layer formed on the surface of the body, the first layer being substantially light absorbing and having a mark formed therein for permeating light therethrough; and a second layer formed on the first layer, the second layer being substantially light permeable and is formed to provide a protective covering over the first layer and the body, wherein the mark is illuminatable by light permeating through the body towards the first layer, the light generatable and provided by the illuminator.

2. The multilayer structure of claim 1, wherein the body having a surface is formed by plastic injection molding.

3. The multilayer structure of claim 2, wherein the body comprises acrylonitrile butadiene styrene (ABS) plastic.

4. The multilayer structure of claim 1, wherein the first layer comprises a layer of light absorbing material sprayed on the surface of the body.

5. The multilayer structure of claim 4, wherein a portion of the first layer is removed to form the mark thereon for exposing a portion of the surface of the body.

6. The multilayer structure of claim 5, wherein the first layer is laser etched to form the mark thereon for exposing the portion of the surface of the body.

7. The multilayer structure of claim 1, wherein the first layer is formed from light absorbing paint.

8. The multilayer structure of claim 1, wherein the second layer is formed from hydrophobic material.

9. The multilayer structure of claim 1, wherein the second layer is formed from translucent paint for providing tactile sensation to a user.

10. The multilayer structure of claim 9, wherein the translucent paint comprises polyurethane.

11. A peripheral device comprising:

a body having a surface;

an illuminator contained in the body, at least a portion of the surface outwardly opposes the illuminator;

a first layer formed on the surface of the body, the first layer being substantially light absorbing and having a mark formed therein for permeating light therethrough; and a second layer formed on the first layer, the second layer being substantially light permeable and is formed to provide a protective covering over the first layer and the body, wherein the mark is illuminatable by light permeating through the body towards the first layer, the light generatable and provided by the illuminator.

12. The peripheral device of claim 11, wherein the body having a surface is formed by plastic injection molding.

13. The peripheral device of claim 12, wherein the body comprises acrylonitrile butadiene styrene (ABS) plastic.

14. The peripheral device of claim 11, wherein the first layer comprises a layer of light absorbing material sprayed on the surface of the body.

15. The peripheral device of claim 14, wherein a portion of the first layer is removed to form the mark thereon for exposing a portion of the surface of the body.

16. The peripheral device of claim 15, wherein the first layer is laser etched to form the mark thereon for exposing the portion of the surface of the body.

17. The peripheral device of claim 11, wherein the first layer is formed from light absorbing paint.

18. The peripheral device of claim 11, wherein the second layer is formed from hydrophobic material.

19. The peripheral device of claim 11, wherein the second layer is formed from translucent paint.

20. The peripheral device of claim 19, wherein the translucent paint comprises polyurethane.

21. A method for forming a multilayer structure, the method comprising:

forming a body having a surface, the body comprising an illuminator configured to generate light, at least a portion of the surface of the body outwardly opposing the illuminator;

forming a first layer on the surface of the body, the first layer being substantially light absorbing and having a mark formed therein for permeating light therethrough; and forming a second layer having no light transmissive holes therein on the first layer, the second layer being substantially light permeable and is formed to provide a protective covering over the first layer and the body;

wherein the mark is illuminatable by light permeating through the body towards the first layer, the light generated and provided by the illuminator.

22. The method as in claim 21, wherein the surface of the body is formed by plastic injection moulding.

23. The method as in claim 22, wherein the body comprises acrylonitrile butadiene styrene (ABS) plastic.

24. The method as in claim 21, wherein forming the first layer on the surface of the body comprises spraying a layer of light absorbing material on the surface of the body.

25. The method as in claim 24, wherein forming the first layer on the surface of the body further comprises removing a portion of the first layer to form the mark thereon for exposing a portion of the surface of the body.

26. The method of claim 25, wherein removing a portion of the first layer comprises laser etching the first layer to form the mark thereon for exposing the portion of the surface of the body.

27. The method as in claim 21, wherein the first layer is formed from light absorbing paint.

28. The method of claim 21, wherein forming the second layer on the first layer comprises coating a layer of hydrophobic material on the first layer.

29. The method of claim 21, wherein the second layer is formed from translucent paint for providing tactile sensation to a user.

30. The method of claim 29, wherein the translucent paint comprises polyurethane.

* * * * *